(12) United States Patent
Dharmadhikari et al.

(10) Patent No.: US 12,492,682 B2
(45) Date of Patent: Dec. 9, 2025

(54) HEATING CIRCUIT FOR A HEATING SYSTEM OF A WIND TURBINE AND METHODS OF OPERATING SAME

(71) Applicant: GE Infrastructure Technology LLC, Greenville, SC (US)

(72) Inventors: Parag Rameshchandra Dharmadhikari, Neufahrn b. Freising (DE); Yarú Méndez, Vejle (DK); Victor Miranda, Billund (DK)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 20 days.

(21) Appl. No.: 18/423,617

(22) Filed: Jan. 26, 2024

(65) Prior Publication Data

US 2025/0243848 A1    Jul. 31, 2025

(51) Int. Cl.
  *F03D 80/40*  (2016.01)
  *F03D 13/20*  (2016.01)
  *F03D 80/60*  (2016.01)

(52) U.S. Cl.
  CPC ......... *F03D 80/401* (2023.08); *F03D 13/201* (2023.08); *F03D 80/60* (2016.05); *F05B 2260/20* (2013.01)

(58) Field of Classification Search
  CPC ................ F03D 80/401; F03D 80/602; F05B 2270/303; F05B 2270/3032
  See application file for complete search history.

(56) References Cited

U.S. PATENT DOCUMENTS

| | | | |
|---|---|---|---|
| 11,414,196 B2* | 8/2022 | Burton | B64D 15/12 |
| 12,078,144 B2* | 9/2024 | Dharmadhikari | F03D 80/40 |
| 2023/0348074 A1* | 11/2023 | Bratianu-Badea | B64D 15/12 |

FOREIGN PATENT DOCUMENTS

| | | |
|---|---|---|
| CN | 107 100 803 B | 3/2019 |
| EP | 3 015 707 B1 | 7/2018 |
| EP | 3 645 879 B1 | 5/2022 |
| EP | 3 478 959 B1 | 6/2022 |
| WO | WO 2017/108064 A1 | 6/2017 |
| WO | WO 2020/125895 A1 | 6/2020 |

OTHER PUBLICATIONS

EPO Search Report, Jul. 4, 2025.

* cited by examiner

*Primary Examiner* — Danielle M. Christensen
(74) *Attorney, Agent, or Firm* — Dority & Manning, P.A.

(57) ABSTRACT

A method of operating a heating system of a wind turbine connected to an electrical grid. The method includes receiving, via a heating circuit of the heating system, a voltage signal from the electrical grid. The method also includes processing the voltage signal using the heating circuit of the heating system. Processing the voltage signal using the heating circuit of the heating system includes superimposing a pulse width modulation (PWM) signal onto the voltage signal. Further, the method includes providing continuous temperature control to at least one heating element of the heating system via the PWM signal from the heating circuit. In addition, the method includes maintaining a temperature of the at least one heating element within a temperature range using the PWM signal during operation of the wind turbine to minimize temperature cycling of the at least one heating element.

20 Claims, 6 Drawing Sheets

HEATING CIRCUIT FOR A HEATING SYSTEM OF A WIND TURBINE AND METHODS OF OPERATING SAME

FIELD

The present disclosure relates generally to wind turbines and, more particularly, to a heating circuit for a heating system of a wind turbine for mitigating ice on the wind turbine and methods of operating same.

BACKGROUND

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

With new developments in the wind industry, wind turbines are exploring new zones and getting into remote and extreme weather locations in an effort to tap the energy. Thus, in certain instances, the rotors are more complex and, in addition to pitch controls, may require additional systems such as ice mitigation systems, which require more power. In addition, such systems operate on different potential and current levels and sometimes cannot maintain common potential due to certain limitations of power devices or an application.

BRIEF DESCRIPTION

Aspects and advantages of the invention will be set forth in part in the following description, or may be obvious from the description, or may be learned through practice of the invention.

In an aspect, the present disclosure is directed to a method of operating a heating system of a wind turbine connected to an electrical grid. The method includes receiving, via a heating circuit of the heating system, a voltage signal from the electrical grid; processing the voltage signal using the heating circuit of the heating system. Processing the voltage signal using the heating circuit of the heating system includes superimposing a pulse width modulation (PWM) signal onto the voltage signal. The method also includes providing continuous temperature control to at least one heating element of the heating system via the PWM signal from the heating circuit. Further, the method includes maintaining a temperature of the at least one heating element within a temperature range using the PWM signal during operation of the wind turbine to minimize temperature cycling of the at least one heating element.

In another aspect, the present disclosure is directed to a heating system. The heating system includes at least one heating element and a heating circuit electrically coupled to the at least one heating element. The heating circuit is configured to perform a plurality of operations, including but not limited to receiving a voltage signal from the electrical grid; processing the voltage signal, wherein processing the voltage signal comprises superimposing a pulse width modulation (PWM) signal onto the voltage signal; providing continuous temperature control to the at least one heating element via the PWM signal; and maintaining a temperature of the at least one heating element within a temperature range using the PWM signal to minimize temperature cycling of the at least one heating element.

In yet another aspect, the present disclosure is directed to a wind turbine connected to an electrical grid. The wind turbine includes a tower, a nacelle mounted atop the tower, and a rotatable hub mounted to the nacelle. The rotatable hub has at least one rotor blade mounted thereto. The wind turbine further includes a heating system for mitigating ice on the wind turbine. The heating system includes at least one heating element and a heating circuit electrically coupled to the at least one heating element. The heating circuit is configured to perform a plurality of operations, including but not limited to receiving a voltage signal from the electrical grid; processing the voltage signal, wherein processing the voltage signal comprises superimposing a pulse width modulation (PWM) signal onto the voltage signal; providing continuous temperature control to the at least one heating element via the PWM signal; and maintaining a temperature of the at least one heating element within a temperature range using the PWM signal to minimize temperature cycling of the at least one heating element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
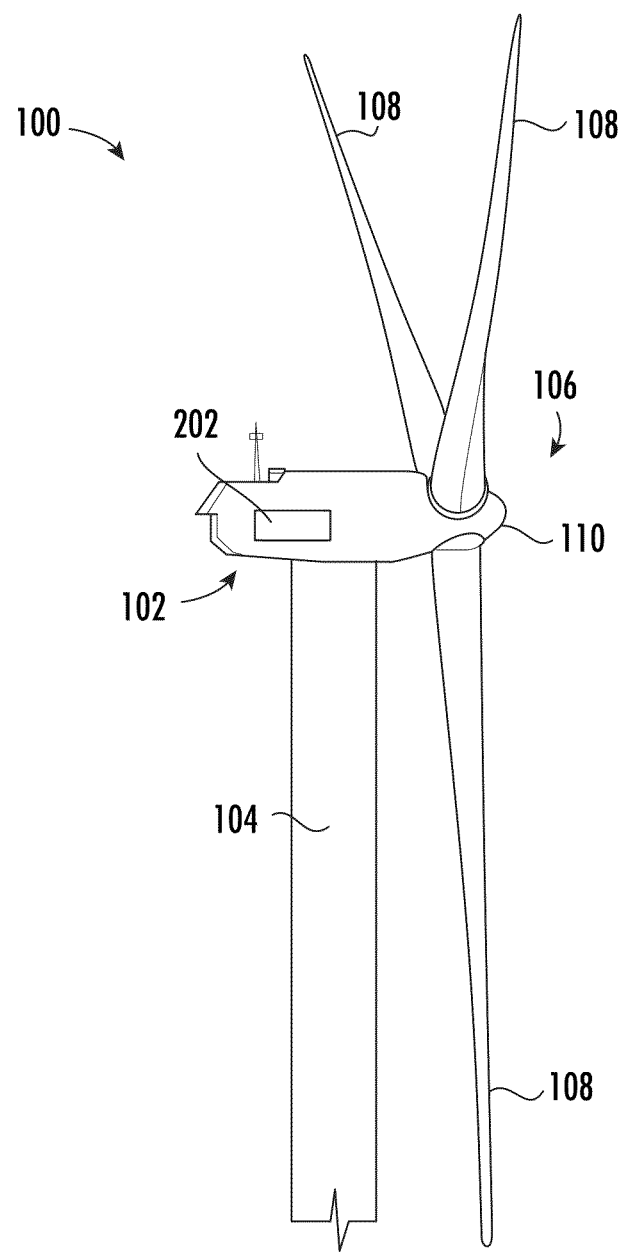
FIG. 1 illustrates a partial, perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

The wind turbines and aircraft industry are entering new zones and being located in more remote and extreme climates to capture the energy. The airfoils, rotors and rotor blades are also becoming more complex. In particular, in addition to pitch controls, various systems such as ice mitigation or deicing systems are more common and demand more power. On and above such systems are working on different potential and current levels, which sometimes cannot be maintained on common potential due to limitation of power devices or an application.

Accordingly, the present disclosure is generally related to a heating system having at least one heating element and a heating circuit electrically coupled to the heating element(s). Further, the heating circuit is configured to receive a voltage signal from the electrical grid and process the voltage signal by implementing the ZCD algorithm to the voltage signal, superimposing a pulse width modulation (PWM) signal onto the voltage signal, and implementing integral cycle control (ICC) (e.g., complete one or more cycles in integer) to the PWM signal to reduce harmonics fed into the electrical grid. Moreover, the heating circuit is configured to provide continuous temperature control to the heating element(s) via the PWM signal and maintain a temperature of the heating element(s) within a temperature range using the PWM signal during operation of the wind turbine to minimize temperature cycling of the heating element(s).

As such, systems and methods of the present disclosure are configured to simplify operation of the heating element(s) and increase reliability of the heating system by accommodating logic and components that ensure the sinusoidal current and acceptable power quality. Thus, systems and methods of the present disclosure are configured to reduce harmonics effects on the grid. Moreover, electromagnetic compatibility (EMC) is improved, and electromagnetic emissions are reduced and/or eliminated due to the use of ICC.

Referring now to the figures, FIG. 1 illustrates a partial, perspective view of an embodiment of a wind turbine 100 according to the present disclosure. In the illustrated embodiment, the wind turbine 100 is a horizontal-axis wind turbine. Alternatively, the wind turbine 100 may be a vertical-axis wind turbine. Further, as shown, the wind turbine 100 includes a nacelle 102 that houses a generator (not shown in FIG. 1). The nacelle 102 is mounted on a tower 104 (a portion of the tower 104 being shown in FIG. 1). The tower 104 may have any suitable height that facilitates operation of the wind turbine 100 as described herein. The wind turbine 100 also includes a rotor 106. The rotor 106 may include three rotor blades 108 attached to a rotating hub 110. Alternatively, the wind turbine 100 may include any number of rotor blades 108 that facilitates operation of the wind turbine 100 as described herein. The wind turbine 100 may include a gearbox (not shown in FIG. 1) operatively coupled to the rotor 106 and a generator (not shown in FIG. 1). The rotor blades 108 are spaced about the hub 110 to facilitate rotating the rotor 106 to enable kinetic energy to be transferred from the wind into usable mechanical energy, and subsequently, electrical energy.

The wind turbine 100 may also include a turbine controller 202 for controlling the various components thereof. In the illustrated embodiment, the turbine controller 202 is shown as being centralized within the nacelle 102, however, the turbine controller 202 may also be a distributed system throughout the wind turbine 100, on a support system (not shown in FIG. 1), within a wind farm, and/or at a remote control center.

Figure 2:
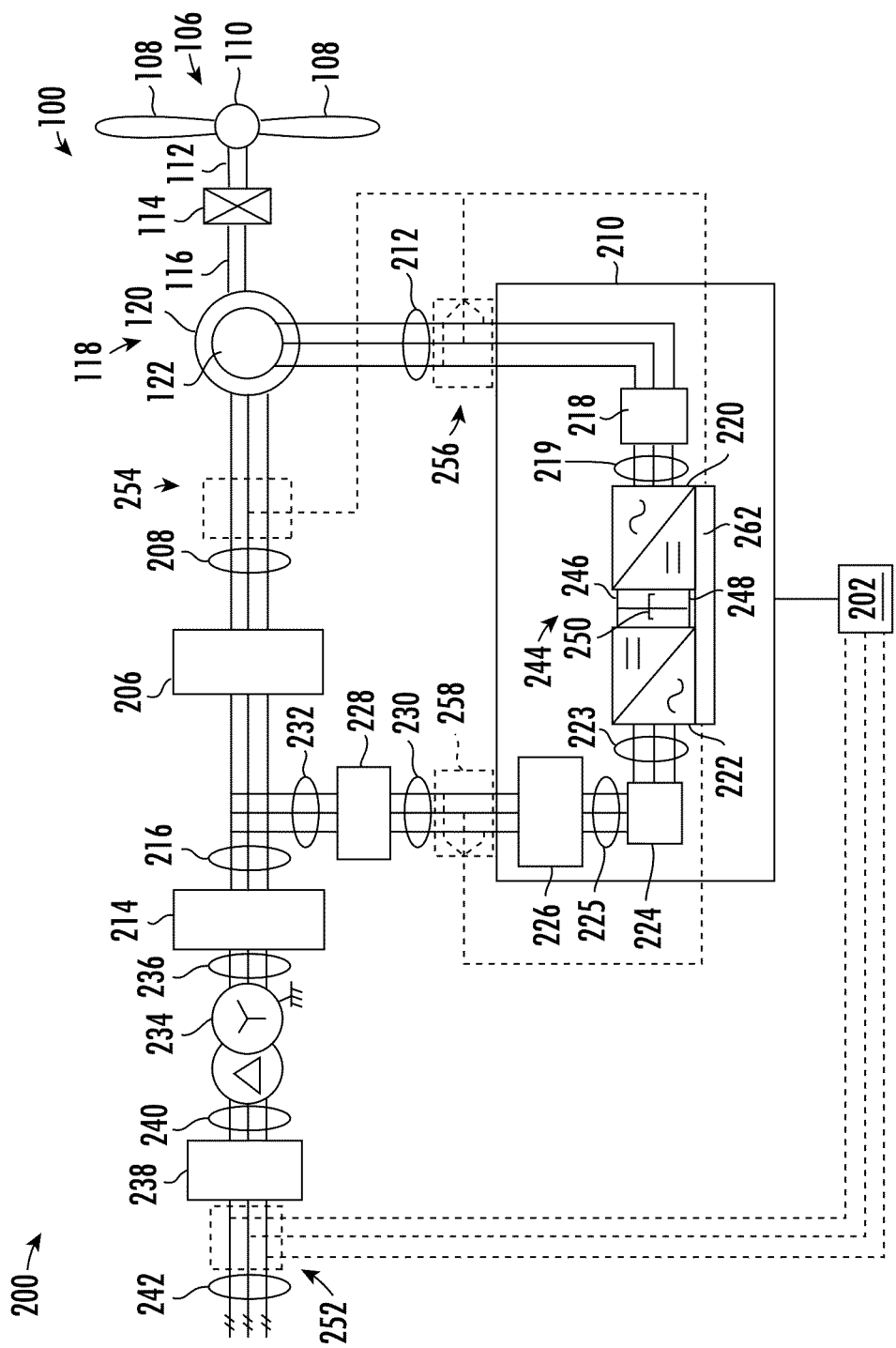
FIG. 2 illustrates a schematic view of an embodiment of an electrical and control system of a wind turbine according to the present disclosure.

Referring now to FIG. 2, a schematic view of an embodiment of an electrical (power) and control system 200 that may be used with the wind turbine 100 is illustrated. During operation, wind impacts the rotor blades 108 and the rotor blades 108 transform wind energy into a mechanical rotational torque that rotatably drives a low-speed shaft 112 via the hub 110. In an embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in an embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main step-up transformer 234 via a stator bus 208, a stator synchronizing switch 206, a system bus 216, a step-up transformer circuit breaker 214, and a generator-side bus 236. The step-up transformer 234 steps up the voltage amplitude of the electrical power such that the transformed electrical power may be further transmitted to a grid via a grid circuit breaker 238, a breaker-side bus 240, and a grid bus 242.

Figure 3:
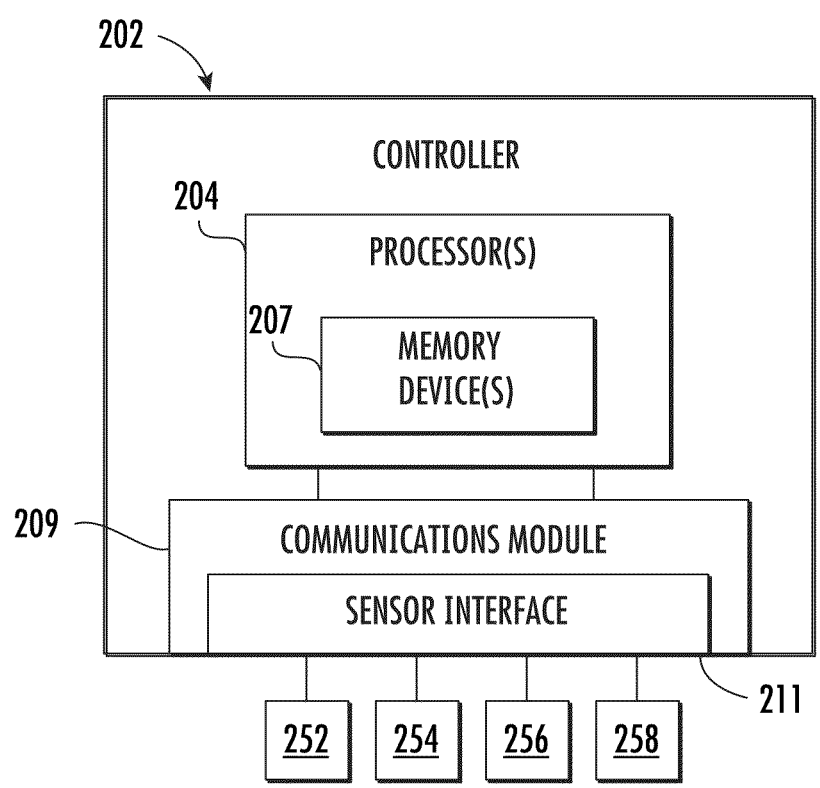
FIG. 3 illustrates a block diagram of a controller for a wind turbine according to the present disclosure.

In addition, the turbine controller 202 is configured to control any of the components of the wind turbine 100 and/or implement any of the method steps as described herein. For example, as shown particularly in FIG. 3, the turbine controller 202 may include one or more processor(s) 204 and associated memory device(s) 207 configured to perform a variety of computer-implemented functions (e.g., performing the methods, steps, calculations and the like and storing relevant data as disclosed herein). Additionally, the turbine controller 202 may also include a communications module 209 to facilitate communications between the turbine controller 202 and the various components of the wind turbine 100, e.g. any of the components of FIG. 2. The communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors 252, 254, 256, 258.

Further, at least one additional sensor (not shown) may be provided for sensor data referring to meteorological data, e.g. sensor(s) provided by a meteorological mast. The at least one additional sensor may in particular include a sensor for determining a wind speed at the rotor 106 of the wind turbine 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally include memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the turbine controller 202 to perform the various functions as described herein.

Referring still to FIG. 2, the generator stator 120 may be electrically coupled to the stator synchronizing switch 206 via the stator bus 208. In an embodiment, to facilitate the DFIG configuration, the generator rotor 122 is electrically coupled to a bi-directional power conversion assembly 210 via a rotor bus 212. Alternatively, the generator rotor 122 is electrically coupled to the rotor bus 212 via any other device that facilitates operation of the electrical and control system 200 as described herein. As a further alternative, the electrical and control system 200 is configured as a full power conversion system (not shown) that includes a full power conversion assembly (not shown in FIG. 2) similar in design and operation to the power conversion assembly 210 and electrically coupled to the generator stator 120. The full power conversion assembly facilitates channeling electric power between the generator stator 120 and an electric power transmission and distribution grid (not shown).

In an embodiment, the stator bus 208 transmits three-phase power from the generator stator 120 to the stator synchronizing switch 206. The rotor bus 212 transmits three-phase power from the generator rotor 122 to the power conversion assembly 210. In an embodiment, the stator synchronizing switch 206 is electrically coupled to a step-up transformer circuit breaker 214 via a system bus 216. In an embodiment, one or more fuses (not shown) are used instead of the step-up transformer circuit breaker 214. In another embodiment, neither fuses nor the step-up transformer circuit breaker 214 is used.

The power conversion assembly 210 includes a rotor filter 218 that is electrically coupled to the generator rotor 122 via the rotor bus 212. A rotor filter bus 219 electrically couples the rotor filter 218 to a rotor-side power converter 220, and the rotor-side power converter 220 is electrically coupled to a line-side power converter 222. The rotor-side power converter 220 and the line-side power converter 222 are power converter bridges including power semiconductors (not shown). In an embodiment, the rotor-side power converter 220 and the line-side power converter 222 are configured in a three-phase, pulse width modulation (PWM) configuration including insulated gate bipolar transistor (IGBT) switching devices (not shown in FIG. 2) that operate as known in the art. Alternatively, the rotor-side power converter 220 and the line-side power converter 222 have any configuration using any switching devices that facilitate operation of the electrical and control system 200 as described herein. The power conversion assembly 210 is coupled in electronic data communication with the turbine controller 202 to control the operation of the rotor-side power converter 220 and the line-side power converter 222.

In an embodiment, a line-side power converter bus 223 electrically couples the line-side power converter 222 to a line filter 224. Also, a line bus 225 electrically couples the line filter 224 to a line contactor 226. Moreover, the line contactor 226 is electrically coupled to a conversion circuit breaker 228 via a conversion circuit breaker bus 230. In addition, the conversion circuit breaker 228 is electrically coupled to the step-up transformer circuit breaker 214 via the system bus 216 and a connection bus 232. Alternatively, the line filter 224 is electrically coupled to the system bus 216 directly via the connection bus 232 and includes any suitable protection scheme (not shown) configured to account for removal of the line contactor 226 and the conversion circuit breaker 228 from the electrical and control system 200. The step-up transformer circuit breaker 214 is electrically coupled to the step-up transformer 234 via the generator-side bus 236. Further, the step-up transformer 234 is electrically coupled to the grid circuit breaker 238 via the breaker-side bus 240. The grid circuit breaker 238 is connected to the electric power transmission and distribution grid via the grid bus 242. In an alternative embodiment, the step-up transformer 234 is electrically coupled to one or more fuses (not shown), rather than to the grid circuit breaker 238, via the breaker-side bus 240. In another embodiment, neither fuses nor grid circuit breaker 238 is used, but rather the step-up transformer 234 is coupled to the electric power transmission and distribution grid via the breaker-side bus 240 and the grid bus 242.

Still referring to FIG. 2, in an embodiment, the rotor-side power converter 220 is coupled in electrical communication with the line-side power converter 222 via a single direct current (DC) link 244. Alternatively, the rotor-side power converter 220 and the line-side power converter 222 are electrically coupled via individual and separate DC links (not shown in FIG. 2). Further, as shown, the DC link 244 includes a positive rail 246, a negative rail 248, and at least one capacitor 250 coupled between the positive rail 246 and the negative rail 248. Alternatively, the capacitor 250 includes one or more capacitors configured in series and/or in parallel between the positive rail 246 and the negative rail 248.

In an embodiment, the turbine controller 202 is configured to receive a plurality of voltage and electric current measurement signals from a first set of voltage and electric current sensors 252. Moreover, the turbine controller 202 is configured to monitor and control at least some of the operational variables associated with the wind turbine 100. In an embodiment, each of three voltage and electric current sensors 252 are electrically coupled to each one of the three phases of the grid bus 242. Accordingly, a current frequency of the grid may be determined by the turbine controller 202. Alternatively or in addition, the turbine controller 202 may be functionally coupled with a frequency sensor connectable with the grid. Further, it is possible that the turbine controller 202 receives the current frequency of the grid or at least a signal representative for the current frequency of the grid via primary plant controller such as a wind farm controller functionally coupled with a respective sensor.

As shown in FIG. 2, the electrical and control system 200 also includes a converter controller 262 that is configured to receive a plurality of voltage and electric current measurement signals. For example, in one embodiment, the converter controller 262 receives voltage and electric current measurement signals from a second set of voltage and electric current sensors 254 coupled in electronic data communication with an exemplary three-phase stator bus 208. The converter controller 262 receives a third set of voltage and electric current measurement signals from a third set of voltage and electric current sensors 256 coupled in electronic data communication with rotor bus 212. Further, in an embodiment, the converter controller 262 also receives a fourth set of voltage and electric current measurement signals from a fourth set of voltage and electric current sensors 258 coupled in electronic data communication with the conversion circuit breaker bus 230. The second set of voltage and electric current sensors 254 is substantially similar to the first set of voltage and electric current sensors 252, and the fourth set of voltage and electric current sensors 264 is substantially similar to the third set of voltage and electric current sensors 256. Further, in an embodiment, the converter controller 262 is substantially similar to the turbine controller 202 and is coupled in electronic data communication with the turbine controller 202. Moreover, in an embodiment, the converter controller 262 is physically integrated within the power conversion assembly 210. Alternatively, the converter controller 262 has any configuration that facilitates operation of the electrical and control system 200 as described herein.

During operation, wind impacts the rotor blades 108 and the rotor blades 108 transform wind energy into a mechanical rotational torque that rotatably drives the low-speed shaft 112 via the hub 110. The low-speed shaft 112 drives the gearbox 114 that subsequently steps up the low rotational speed of the low-speed shaft 112 to drive the high-speed shaft 116 at an increased rotational speed. The high-speed shaft 116 rotatably drives the generator rotor 122. A rotating magnetic field is induced by the generator rotor 122 and a voltage is induced within the generator stator 120 that is magnetically coupled to the generator rotor 122. The generator converts the rotational mechanical energy to a sinusoidal, three-phase alternating current (AC) electrical energy signal in the generator stator 120. In an embodiment, the associated electrical power is transmitted to the step-up transformer 234 via the stator bus 208, the stator synchronizing switch 206, the system bus 216, the step-up transformer circuit breaker 214, and the generator-side bus 236. The step-up transformer 234 steps up the voltage amplitude of the electrical power and the transformed electrical power is further transmitted to the grid via breaker-side bus 240, the grid circuit breaker 238, and the grid bus 242.

In an embodiment, a second electrical power transmission path is provided. Electrical, three-phase, sinusoidal, AC power is generated within the generator rotor 122 and is transmitted to the power conversion assembly 210 via the rotor bus 212. Within the power conversion assembly 210, the electrical power is transmitted to the rotor filter 218 and the electrical power is modified for the rate of change of the PWM signals associated with the rotor-side power converter 220. The rotor-side power converter 220 acts as a rectifier and rectifies the sinusoidal, three-phase AC power to DC power. The DC power is transmitted into the DC link 244. The capacitor 250 facilitates mitigating the DC link voltage amplitude variations by facilitating mitigation of a DC ripple associated with AC rectification.

The DC power is subsequently transmitted from the DC link 244 to the line-side power converter 222 and the line-side power converter 222 acts as an inverter configured to convert the DC electrical power from the DC link 244 to three-phase, sinusoidal AC electrical power with pre-determined voltages, currents, and frequencies. This conversion is monitored and controlled via the converter controller 262. The converted AC power is transmitted from the line-side power converter 222 to the system bus 216 via the line-side power converter bus 223 and the line bus 225, the line contactor 226, the conversion circuit breaker bus 230, the conversion circuit breaker 228, and the connection bus 232. The line filter 224 compensates or adjusts for harmonic currents in the electric power transmitted from line-side power converter 222. The stator synchronizing switch 206 can close to facilitate connecting the three-phase power from the generator stator 120 with the three-phase power from the power conversion assembly 210.

The conversion circuit breaker 228, the step-up transformer circuit breaker 214, and the grid circuit breaker 238 are configured to disconnect corresponding buses, for example, when excessive current flow may damage the components of the electrical and control system 200. Additional protection components are also provided including the line contactor 226, which may be controlled to form a disconnect by opening a switch (not shown in FIG. 2) corresponding to each line of line bus 225.

As such, the power conversion assembly 210 compensates or adjusts the frequency of the three-phase power from the generator rotor 122 for changes, for example, in the wind speed at the hub 110 and the rotor blades 108. Therefore, in this manner, mechanical and electrical rotor frequencies are decoupled from stator frequency.

Figure 4:
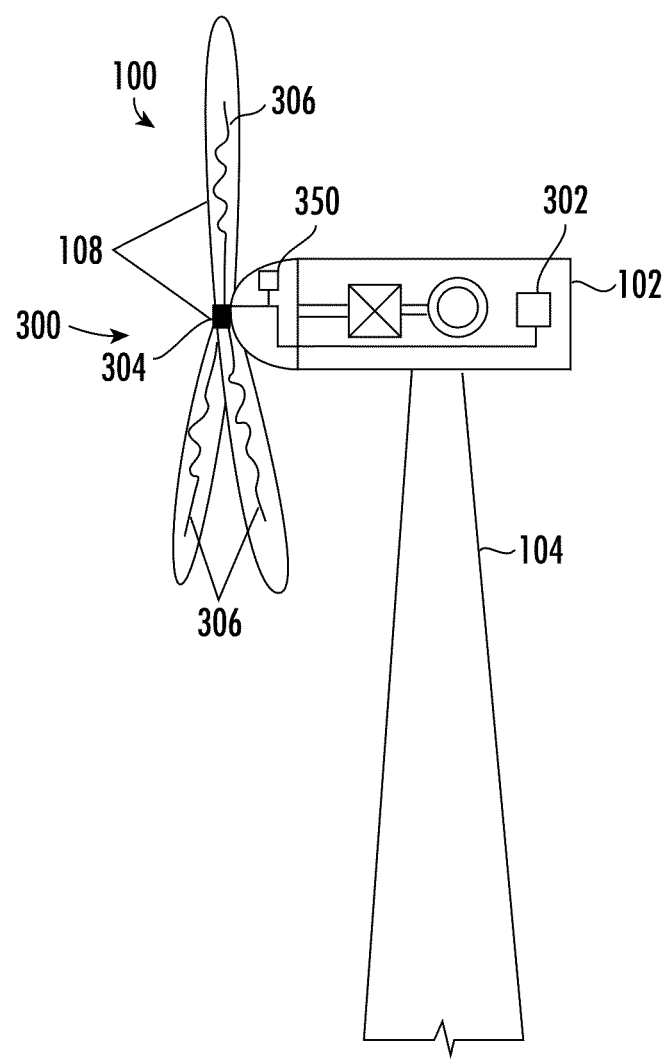
FIG. 4 illustrates a perspective view of an embodiment of a wind turbine, particularly illustrating an ice mitigation and detection of the wind turbine according to the present disclosure.

Referring now to FIG. 4, a simplified, schematic diagram of an embodiment of the wind turbine 100 of FIG. 1 is illustrated, particularly illustrating an ice detection and heating system 300 (also referred to herein as "heating system") according to the present disclosure. Since the configuration of this embodiment is similar to the embodiment shown in FIG. 1, only the differences will be described. As shown, the heating system 300 may generally include detection means 302 connected to sensor means 304 arranged with one or more of the rotor blades 108, such as the roots of the rotor blades 108. Further, as shown, the sensor means 304 is adapted to measure the load and/or the vibrations of the rotor blades 108. Although the sensor means 304 is illustrated as only a single sensor for all three rotor blades 108, it may also be advantageous to use an individual sensor for each rotor blade 108. Thus, an imbalance of the rotor blades 108 can be easily detected by the sensor means 304. As such, the heating system 300 uses the sensor data to detect an icing condition of the wind turbine 100. In response, the heating system 300 is configured to activate one or more heating elements 306 arranged with one or more rotor blades 108 of the wind turbine 100 (or any other wind turbine component) to mitigate ice formation thereon. More specifically, as will be explained in more detail, the heating system 300 includes a heating circuit 350 electrically coupled to the heating element(s) 306.

Figure 5:
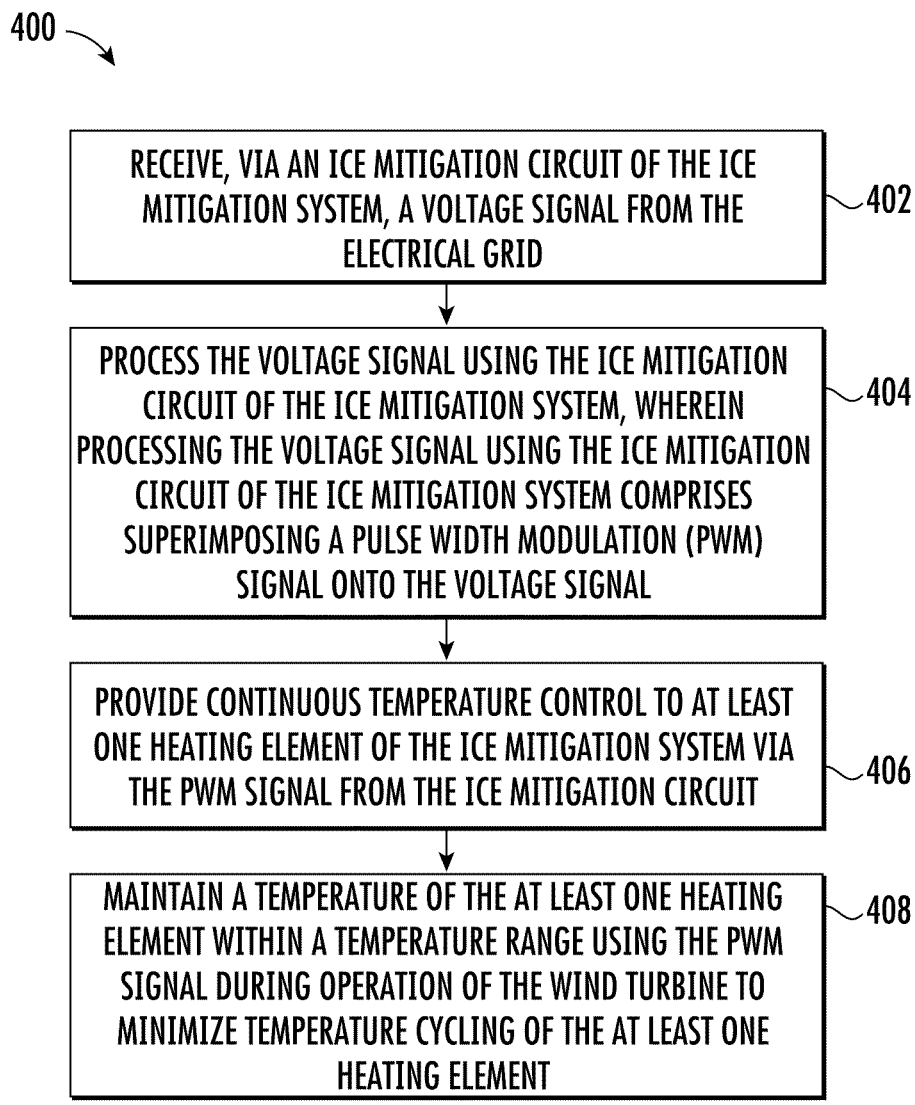
FIG. 5 illustrates a flow diagram of an embodiment of a method of operating a heating system for a wind turbine according to the present disclosure.

Referring now to FIG. 5, a flow diagram of an embodiment of a method 400 of operating a heating system, such as the heating system 300, of a wind turbine connected to an electrical grid is illustrated according to the present disclosure. In general, the method 400 will be described herein with reference to the wind turbine 100 and the electrical and control system 200 described above with reference to FIGS. 1-4. However, it should be appreciated by those of ordinary skill in the art that the disclosed method 400 may generally be utilized to operate any other wind turbine having any suitable configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 includes receiving, via a heating circuit of the heating system, a voltage signal from the electrical grid. As shown at (404), the method 400 includes processing the voltage signal using the heating circuit of the heating system, wherein processing the voltage signal using the heating circuit of the heating system comprises superimposing a pulse width modulation (PWM) signal onto the voltage signal. As shown at (406), the method 400 includes providing continuous temperature control to at least one heating element of the heating system via the PWM signal from the heating circuit. As shown at (408), the method 400 includes maintaining a temperature of the at least one heating element within a temperature range using the PWM signal during operation of the wind turbine to minimize temperature cycling of the at least one heating element.

Figure 6:
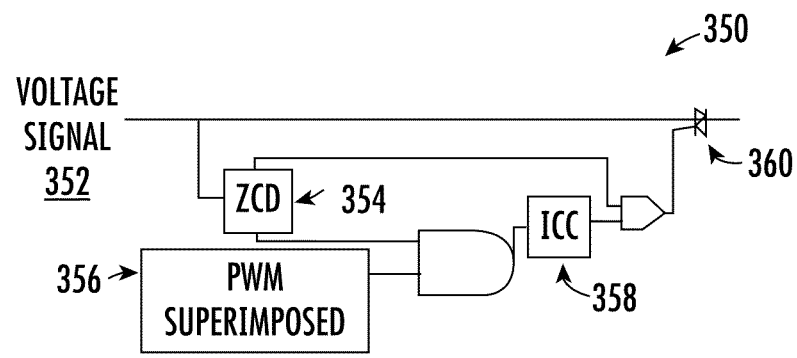
FIG. 6 illustrates a schematic diagram of an embodiment of a heating circuit for a wind turbine according to the present disclosure.

The method of FIG. 5 can be better understood with reference to FIG. 6. In particular, as shown, a schematic diagram of an embodiment of the heating circuit 350 according to the present disclosure is illustrated. As shown, the heating circuit 350 receives a voltage signal 352 from the electrical grid. Further, as shown, the heating circuit 350 is then configured to process the voltage signal 352. More specifically, as shown, the heating circuit 350 is configured to process the voltage signal 352 by implementing a zero crossing detection (ZCD) algorithm via a ZCD module 354 to the voltage signal 352 to provide a smooth start for the temperature control.

As used herein, the ZCD module 354 is configured to change the comparator output state when the AC input crosses the zero reference voltage. In an embodiment, this may be accomplished by setting the comparator inverting input to the zero reference voltage and applying the attenuated input to the noninverting input. One or more voltage dividers attenuate the input AC signal and a diode is used to insure the noninverting input never goes below the negative input common mode limit of the comparator.

Furthermore, in an embodiment, the heating circuit 350 is then configured to process the voltage signal 352 by superimposing a pulse width modulation (PWM) signal onto the voltage signal 352, e.g., after implementing the ZCD algorithm to the voltage signal 352. Moreover, as shown, the heating circuit 350 is configured to implement integral cycle control (ICC) via an ICC module 358 to the PWM signal to reduce harmonics fed into the electrical grid. As used herein, integral cycle control generally refers to a converter that has the ability to perform direct switching without losses. In an example, the process directly converts AC to AC without having to perform the intermediate processes of AC to DC and then DC to AC.

Thus, the output of the ICC module 358 is then fed to a semiconductor device 360. As such, in an embodiment, providing the continuous temperature control to the heating element(s) 306 via the PWM signal from the heating circuit 350 may include gating the semiconductor device(s) 360 on and off to apply the PWM signal to the heating element(s) 306 so as to provide power thereto. In an embodiment, for example, the semiconductor device(s) 360 of the heating circuit 350 may be any one of or a combination of a thyristor, a diode, a metal-oxide-semiconductor field-effect transistor (MOFSET), and/or an insulated-gate bipolar transistor (IGBT).

Figure 7:
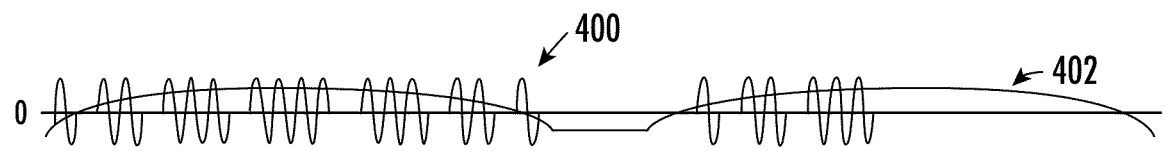
FIG. 7 illustrates an example voltage signal superimposed with a PWM signal according to the present disclosure.

Referring now to FIG. 7, an example voltage signal 400 superimposed with a PWM signal 402 is illustrated according to the present disclosure. Thus, as shown, the PWM superimposition of the present disclosure provides thermal performance smoothening and thermal stresses elimination as the rotor blades 108. Furthermore, the ICC module eliminates harmonics from being fed back to the grid, thereby saving on power quality and undesired overheating. Thus, electrical stresses of the overall system are reduced and there is no electromagnetic emissions (EMI) issue. Moreover, the ZCD module provides a smooth start to the heating circuit 350, which also reduces electrical stresses and EMI generation at start.

Further aspects of the invention are provided by the subject matter of the following clauses:

A method of operating a heating system of a wind turbine connected to an electrical grid, the method comprising: receiving, via a heating circuit of the heating system, a voltage signal from the electrical grid; processing the voltage signal using the heating circuit of the heating system, wherein processing the voltage signal using the heating circuit of the heating system comprises superimposing a pulse width modulation (PWM) signal onto the voltage signal; providing continuous temperature control to at least one heating element of the heating system via the PWM signal from the heating circuit; and maintaining a temperature of the at least one heating element within a temperature range using the PWM signal during operation of the wind turbine to minimize temperature cycling of the at least one heating element.

The method of any preceding clause, wherein processing the voltage signal using the heating circuit of the heating system further comprises: implementing a zero crossing detection (ZCD) algorithm to the voltage signal to provide a smooth start for the temperature control.

The method of any preceding clause, wherein superimposing the PWM signal onto the voltage signal occurs after implementing the ZCD algorithm to the voltage signal.

The method of any preceding clause, wherein processing the voltage signal using the heating circuit of the heating system further comprises further comprises: implementing integral cycle control (ICC) to the PWM signal to reduce harmonics fed into the electrical grid.

The method of any preceding clause, wherein superimposing the PWM signal onto the voltage signal occurs before implementing the ICC to the PWM signal.

The method of any preceding clause, wherein providing the continuous temperature control to the at least one heating element of the heating system via the PWM signal from the heating circuit further comprises: gating at least one semiconductor device of the heating circuit on and off to apply the PWM signal to the at least one heating element so as to provide power to the at least one heating element.

The method of any preceding clause, wherein the at least one semiconductor device of the heating circuit comprises at least one of a thyristor, a diode, a metal-oxide-semiconductor field-effect transistor (MOFSET), or an insulated-gate bipolar transistor (IGBT).

The method of any preceding clause, further comprising arranging the at least one heating element of the heating system one or more rotor blades of the wind turbine.

A heating system, comprising: at least one heating element; and a heating circuit electrically coupled to the at least one heating element, the heating circuit configured to perform a plurality of operations, the plurality of operations comprising: receiving a voltage signal from the electrical grid; processing the voltage signal, wherein processing the voltage signal comprises superimposing a pulse width modulation (PWM) signal onto the voltage signal; providing continuous temperature control to the at least one heating element via the PWM signal; and maintaining a temperature of the at least one heating element within a temperature range using the PWM signal to minimize temperature cycling of the at least one heating element.

The heating system of any preceding clause, wherein the heating circuit comprises a zero crossing detection (ZCD) module, wherein processing the voltage signal further comprises: implementing a ZCD algorithm via the ZCD algorithm module to the voltage signal to provide a smooth start for the temperature control.

The heating system of any preceding clause, wherein superimposing the PWM signal onto the voltage signal occurs after implementing the ZCD algorithm via the ZCD algorithm module to the voltage signal.

The heating system of any preceding clause, wherein the heating circuit comprises an integral cycle control (ICC) module, wherein processing the voltage signal further comprises: implementing ICC via the ICC module to the PWM signal to reduce harmonics fed into the electrical grid.

The heating system of any preceding clause, wherein superimposing the PWM signal onto the voltage signal occurs before implementing the ICC via the ICC module to the PWM signal.

The heating system of any preceding clause, wherein the heating circuit further comprises at least one semiconductor device, and wherein providing continuous temperature control to the at least one heating element via the PWM signal further comprises: gating the at least one semiconductor device on and off to apply the PWM signal to the at least one heating element so as to provide power to the at least one heating element.

The heating system of any preceding clause, wherein the at least one semiconductor device of the heating circuit comprises at least one of a thyristor, a diode, a metal-oxide-semiconductor field-effect transistor (MOFSET), or an insulated-gate bipolar transistor (IGBT).

The heating system of any preceding clause, wherein the at least one heating element of the heating system is arranged on one or more rotor blades of a wind turbine.

A wind turbine connected to an electrical grid, the wind turbine comprising: a tower; a nacelle mounted atop the tower; a rotatable hub mounted to the nacelle, the rotatable hub having at least one rotor blade mounted thereto; a heating system for mitigating ice on the wind turbine, comprising: at least one heating element arranged with the at least one rotor blade; and a heating circuit electrically coupled to the at least one heating element, the heating circuit configured to perform a plurality of operations, the plurality of operations comprising: receiving a voltage signal from the electrical grid; processing the voltage signal, wherein processing the voltage signal comprises superimposing a pulse width modulation (PWM) signal onto the voltage signal; providing continuous temperature control to the at least one heating element via the PWM signal; and maintaining a temperature of the at least one heating element within a temperature range using the PWM signal during operation of the wind turbine to minimize temperature cycling of the at least one heating element.

The wind turbine of any preceding clause, wherein the heating circuit comprises a zero crossing detection (ZCD) module and an integral cycle control (ICC) module, wherein processing the voltage signal further comprises: implementing a ZCD algorithm via the ZCD algorithm module to the voltage signal to provide a smooth start for the temperature control; and implementing ICC via the ICC module to the PWM signal to reduce harmonics fed into the electrical grid.

The wind turbine of any preceding clause, wherein superimposing the PWM signal onto the voltage signal occurs after implementing the ZCD algorithm via the ZCD algorithm module to the voltage signal and before implementing the ICC via the ICC module to the PWM signal.

The wind turbine of any preceding clause, wherein the heating circuit further comprises at least one semiconductor device, and wherein providing continuous temperature control to the at least one heating element via the PWM signal further comprises: gating the at least one semiconductor device on and off to apply the PWM signal to the at least one heating element so as to provide power to the at least one heating element, wherein the at least one semiconductor device of the heating circuit comprises at least one of a thyristor, a diode, a metal-oxide-semiconductor field-effect transistor (MOFSET), or an insulated-gate bipolar transistor (IGBT).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a heating system of a wind turbine connected to an electrical grid, the method comprising:
   receiving, via a heating circuit of the heating system, a voltage signal from the electrical grid;
   processing the voltage signal using the heating circuit of the heating system, wherein processing the voltage signal using the heating circuit of the heating system comprises superimposing a pulse width modulation (PWM) signal onto the voltage signal;
providing continuous temperature control to at least one heating element of the heating system via the PWM signal from the heating circuit; and
maintaining a temperature of the at least one heating element within a temperature range using the PWM signal during operation of the wind turbine to minimize temperature cycling of the at least one heating element.

2. The method of claim 1, wherein processing the voltage signal using the heating circuit of the heating system further comprises:
implementing a zero crossing detection (ZCD) algorithm to the voltage signal to provide a smooth start for the temperature control.

3. The method of claim 2, wherein superimposing the PWM signal onto the voltage signal occurs after implementing the ZCD algorithm to the voltage signal.

4. The method of claim 3, wherein processing the voltage signal using the heating circuit of the heating system further comprises further comprises:
implementing integral cycle control (ICC) to the PWM signal to reduce harmonics fed into the electrical grid.

5. The method of claim 4, wherein superimposing the PWM signal onto the voltage signal occurs before implementing the ICC to the PWM signal.

6. The method of claim 1, wherein providing the continuous temperature control to the at least one heating element of the heating system via the PWM signal from the heating circuit further comprises:
gating at least one semiconductor device of the heating circuit on and off to apply the PWM signal to the at least one heating element so as to provide power to the at least one heating element.

7. The method of claim 6, wherein the at least one semiconductor device of the heating circuit comprises at least one of a thyristor, a diode, a metal-oxide-semiconductor field-effect transistor (MOFSET), or an insulated-gate bipolar transistor (IGBT).

8. The method of claim 1, further comprising arranging the at least one heating element of the heating system one or more rotor blades of the wind turbine.

9. A heating system, comprising:
at least one heating element; and
a heating circuit electrically coupled to the at least one heating element, the heating circuit configured to perform a plurality of operations, the plurality of operations comprising:
receiving a voltage signal from the electrical grid;
processing the voltage signal, wherein processing the voltage signal comprises superimposing a pulse width modulation (PWM) signal onto the voltage signal;
providing continuous temperature control to the at least one heating element via the PWM signal; and
maintaining a temperature of the at least one heating element within a temperature range using the PWM signal to minimize temperature cycling of the at least one heating element.

10. The heating system of claim 9, wherein the heating circuit comprises a zero crossing detection (ZCD) module, wherein processing the voltage signal further comprises:
implementing a ZCD algorithm via the ZCD algorithm module to the voltage signal to provide a smooth start for the temperature control.

11. The heating system of claim 10, wherein superimposing the PWM signal onto the voltage signal occurs after implementing the ZCD algorithm via the ZCD algorithm module to the voltage signal.

12. The heating system of claim 11, wherein the heating circuit comprises an integral cycle control (ICC) module, wherein processing the voltage signal further comprises:
implementing ICC via the ICC module to the PWM signal to reduce harmonics fed into the electrical grid.

13. The heating system of claim 12, wherein superimposing the PWM signal onto the voltage signal occurs before implementing the ICC via the ICC module to the PWM signal.

14. The heating system of claim 9, wherein the heating circuit further comprises at least one semiconductor device, and wherein providing continuous temperature control to the at least one heating element via the PWM signal further comprises:
gating the at least one semiconductor device on and off to apply the PWM signal to the at least one heating element so as to provide power to the at least one heating element.

15. The heating system of claim 14, wherein the at least one semiconductor device of the heating circuit comprises at least one of a thyristor, a diode, a metal-oxide-semiconductor field-effect transistor (MOFSET), or an insulated-gate bipolar transistor (IGBT).

16. The heating system of claim 9, wherein the at least one heating element of the heating system is arranged on one or more rotor blades of a wind turbine.

17. A wind turbine connected to an electrical grid, the wind turbine comprising:
a tower;
a nacelle mounted atop the tower;
a rotatable hub mounted to the nacelle, the rotatable hub having at least one rotor blade mounted thereto;
a heating system for mitigating ice on the wind turbine, comprising:
at least one heating element arranged with the at least one rotor blade; and
a heating circuit electrically coupled to the at least one heating element, the heating circuit configured to perform a plurality of operations, the plurality of operations comprising:
receiving a voltage signal from the electrical grid;
processing the voltage signal, wherein processing the voltage signal comprises superimposing a pulse width modulation (PWM) signal onto the voltage signal;
providing continuous temperature control to the at least one heating element via the PWM signal; and
maintaining a temperature of the at least one heating element within a temperature range using the PWM signal during operation of the wind turbine to minimize temperature cycling of the at least one heating element.

18. The wind turbine of claim 17, wherein the heating circuit comprises a zero crossing detection (ZCD) module and an integral cycle control (ICC) module, wherein processing the voltage signal further comprises:
implementing a ZCD algorithm via the ZCD algorithm module to the voltage signal to provide a smooth start for the temperature control; and
implementing ICC via the ICC module to the PWM signal to reduce harmonics fed into the electrical grid.

19. The wind turbine of claim 18, wherein superimposing the PWM signal onto the voltage signal occurs after implementing the ZCD algorithm via the ZCD algorithm module to the voltage signal and before implementing the ICC via the ICC module to the PWM signal.

20. The wind turbine of claim 17, wherein the heating circuit further comprises at least one semiconductor device, and wherein providing continuous temperature control to the at least one heating element via the PWM signal further comprises:

gating the at least one semiconductor device on and off to apply the PWM signal to the at least one heating element so as to provide power to the at least one heating element, wherein the at least one semiconductor device of the heating circuit comprises at least one of a thyristor, a diode, a metal-oxide-semiconductor field-effect transistor (MOFSET), or an insulated-gate bipolar transistor (IGBT).

* * * * *